(12) United States Patent
Mamiya

(10) Patent No.: US 7,724,630 B2
(45) Date of Patent: May 25, 2010

(54) OPTICAL DISC DEVICE AND DISC DETERMINING METHOD

(75) Inventor: Noboru Mamiya, Hodumi Mizuho (JP)

(73) Assignee: Sanyo Electric Co., Ltd., Osaka (JP)

(*) Notice: Subject to any disclaimer, the term of this patent is extended or adjusted under 35 U.S.C. 154(b) by 1015 days.

(21) Appl. No.: 11/414,390

(22) Filed: May 1, 2006

(65) Prior Publication Data
US 2006/0256692 A1 Nov. 16, 2006

(30) Foreign Application Priority Data
May 10, 2005 (JP) .............................. 2005-137937

(51) Int. Cl.
*G11B 7/20* (2006.01)
(52) U.S. Cl. ....................................... 369/94
(58) Field of Classification Search .............. 369/13.39, 369/13.4, 13.53, 94
See application file for complete search history.

(56) References Cited

U.S. PATENT DOCUMENTS 6,466,535 B2 * 10/2002 Park ....................... 369/112.01
6,469,965 B1 * 10/2002 Horita ....................... 369/53.2
7,355,944 B2 * 4/2008 van de Grampel et al. . 369/53.1
2003/0231565 A1 * 12/2003 Kuwayama ............... 369/44.29
2004/0196769 A1 * 10/2004 Nakano et al. ........... 369/53.28

FOREIGN PATENT DOCUMENTS

JP 2003-346348 12/2003

* cited by examiner

*Primary Examiner*—Andrea L Wellington
*Assistant Examiner*—Aneeta Yodichkas
(74) *Attorney, Agent, or Firm*—McDermott Will & Emery LLP

(57) ABSTRACT

The number of recording layers of the loaded disc is determined using the blue laser light. If the number of recording layers is two, drawing is performed in the recording layer on the near side when seen from the laser light entering side, and demodulation is performed with the HDDVD decoder. If demodulatable, the disc is determined as a disc in which two HDDVD layers are arranged. If not demodulatable, determination is made on whether or not the data of the recording layer is demodulatable with the DVD decoder. If demodulatable with the DVD decoder, the laser light is switched to the red laser light and the number of recording layers is determined. If two recording layers are detected in this determination, the disc is determined as a disc in which two DVD layers are arranged. On the other hand, if one recording layer is detected, the disc is determined as a hybrid HDDVD in which one HDDVD layer and one DVD layer are arranged.

9 Claims, 5 Drawing Sheets

US 7,724,630 B2

OPTICAL DISC DEVICE AND DISC DETERMINING METHOD

This application claims priority under 35 U.S.C. §119 of Japanese Patent Application No. 2005-137937 filed May 10, 2005.

BACKGROUND OF THE INVENTION

1. Field of the Invention

The present invention relates to an optical disc device capable of reproducing a two-wavelength two-layer disc configured by a first recording layer responding to a laser light of a first wavelength and a second recording layer responding to a laser light of a second wavelength longer than the first wavelength arranged in sequence from the back side when seen from the laser light entering side and so that the first recording layer is not optically detected when the laser light of the second wavelength is used; and a disc determining method suitably used for such a device.

2. Description of the Related Art

Presently, standardization of the next generation DVD (Digital Versatile Disc) using a blue laser light having a wavelength of about 405 nm is being forwarded. In such standardization, consideration is made on arranging two recording layers for the blue laser light (hereinafter referred to as "HDDVD layer") in the direction of the disc thickness. Further, consideration is made on arranging the HDDVD layer and the recording layer for the red laser light (hereinafter referred to as "DVD layer") in the direction of the disc thickness.

In the next generation DVD (hereinafter referred to as "hybrid HDDVD") in which the HDDVD layer and the DVD layer are arranged in the direction of disc thickness, the DVD layer is arranged on the near side and the HDDVD layer is arranged on the back side when seen from the laser light entering side. The HDDVD layer is formed with a material that cannot be optically detected by the red laser light. Further, the same format as that for the existing DVD is applied to the DVD layer.

Japanese Laid-Open Patent Publication No. 2003-346348 discloses an optical disc including two recording layers and a driving device thereof.

Since the DVD layer in the hybrid HDDVD has the same format as the existing DVD, as described above, reading of data is performed as if a DVD were loaded when the drawing operation during recordation/reproduction is performed from the DVD layer on the near side. Since information indicating that the HDDVD layer additionally exists is not recorded on the DVD layer, the hybrid HDDVD cannot be appropriately determined only from the data read from the disc at the driving side. Thus, the optical disc device requires a means for making an appropriate determination when the hybrid HDDVD is loaded.

In the determination, since the HDDVD layer is not optically detected by the red laser light as described above, it is difficult to determine the hybrid HDDVD using the red laser light. Further, since the DVD in which two DVD layers are arranged, the next generation DVD in which two HDDVD layers are arranged and the like exist in addition to the hybrid HDDVD, a method for smoothly distinguishing such discs and the hybrid HDDVD also becomes necessary.

SUMMARY OF THE INVENTION

The present invention aims to provide an optical disc device that smoothly and rapidly determines a hybrid HDDVD; and a disc determining method.

A first aspect of the present invention relates to an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the optical disc device including a first number of layers detecting means for detecting the number of recording layers arranged in an optical disc by irradiating the laser light of the first wavelength onto the optical disc loaded on the optical disc device; a second number of layers detecting means for detecting the number of recording layers arranged in the optical disc by irradiating the laser light of the second wavelength onto the optical disc; a first demodulating means for performing a demodulation process according to a first data format responding to the laser light of the first wavelength; a second demodulating means for performing a demodulation process according to a second data format responding to the laser light of the second wavelength; a first determining means for determining whether or not demodulatable when demodulating with the first demodulating means the recording layer of the optical disc that appears first when seen from the laser light entering side using the laser light of the first wavelength; a second determining means for determining whether or not demodulatable when demodulating with the second demodulating means the recording layer of the optical disc that appears first when seen from the laser light entering side using the laser light of the first wavelength; and a disc determining means for determining the disc loaded on the optical disc device as the two-wavelength two-layer disc when two recording layers are detected by the first number of layers detecting means, one recording layer is detected by the second number of layers detecting means, determined as not demodulatable by the first determining means, and determined as demodulatable by the second determining means.

According to such aspect, whether or not the two-wavelength two-layer disc is loaded is smoothly and efficiently determined.

Further, since whether or not demodulatable according to the first data format and whether or not demodulatable according to the second data format with respect to the recording layer that appears first when seen from the laser light entering side are both performed using the laser light of the first wavelength in this aspect, the laser light does not need to be switched between the first and the second wavelengths in determining whether or not demodulatable, and thus the disc determining process is rapidly carried out.

Since the laser light of the first wavelength has a shorter wavelength than the laser light of the second wavelength, the spot size obtained when the laser light of the first wavelength converges becomes smaller than that obtained when the laser light of the second wavelength converges. Thus, although the spot size is narrowed down to smaller than usual if the recording layer that appears first when seen from the laser light entering side responds to the laser light of the second wavelength, reading of information is not affected even if the spot size is narrowed down. Thus, determination is appropriately performed without trouble even if determination of whether or not demodulatable according to the first data format and whether or not demodulatable according to the second data format are performed using the laser light of the first wavelength, as in the present invention.

In the first aspect, the disc determining means determines the loaded disc as a disc having two first recording layers arranged in the thickness direction of the disc when two recording layers are detected by the first number of layers detecting means, and determined as demodulatable by the first determining means.

In this case, whether or not a disc in which two first recording layers are arranged is loaded is smoothly determined based on the number of recording layers detected using the first wavelength and whether or not demodulatable according to the first data format.

Further, in the first aspect, the disc determining means determines the loaded disc as a disc having two second recording layers arranged in the thickness direction of the disc when two recording layers are detected by the first number of layers detecting means, two recording layers are detected by the second number of layers detecting means, determined as not demodulatable by the first determining means, and determined as demodulatable according to the second determining means.

In this case, whether or not a disc in which two second recording layers are arranged is loaded is smoothly determined based on the number of recording layers detected using the first and the second wavelengths and whether or not demodulatable according to the first and the second data format.

The first number of layers detecting means in the first aspect is embodied by an optical pickup 101, a signal generation circuit 102, a laser drive circuit 104, and a controller 106 in the following embodiment.

The second number of layers detecting means in the first aspect is embodied by the optical pickup 101, the signal generation circuit 102, the laser drive circuit 104 and the controller 106 in the following embodiment.

The first demodulating means in the first aspect is embodied by an HDDVD decoder in a demodulation circuit 105 in the following embodiment.

The second demodulating means in the first aspect is embodied by a DVD decoder in the demodulation circuit 105 in the following embodiment.

The first determining means in the first aspect is embodied by the demodulation circuit 105 in the following embodiment.

The second determining means in the first aspect is embodied by the demodulation circuit 105 in the following embodiment.

The disc determining means in the first aspect is embodied by the controller 106 in the following embodiment.

A second aspect of the present invention relates to an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the optical disc device including an optical pickup for irradiating the laser light of the first wavelength or the laser light of the second wavelength to a disc loaded on the optical disc device; a first number of layers detecting circuit for detecting the number of recording layers arranged in an optical disc by irradiating the laser light of the first wavelength onto the optical disc loaded on the optical disc device; a second number of layers detecting circuit for detecting the number of recording layers arranged in the optical disc by irradiating the laser light of the second wavelength onto the optical disc; a first demodulating circuit for performing a demodulation process according to a first data format responding to the laser light of the first wavelength; a second demodulating circuit for performing a demodulation process according to a second data format responding to the laser light of the second wavelength; a first determining circuit for determining whether or not demodulatable when demodulating with the first demodulating circuit the recording layer of the optical disc that appears first when seen from the laser light entering side using the laser light of the first wavelength; a second determining circuit for determining whether or not demodulatable when demodulating with the second demodulating circuit the recording layer of the optical disc that appears first when seen from the laser light entering side using the laser light of the first wavelength; and a disc determining circuit for determining the disc loaded on the optical disc device as the two-wavelength two-layer disc when two recording layers are detected by the first number of layers detecting circuit, one recording layer is detected by the second number of layers detecting circuit, determined as not demodulatable by the first determining circuit, and determined as demodulatable by the second determining circuit.

The optical pickup in the second aspect is embodied by the optical pickup 101 in the following embodiment.

The first number of layers detecting circuit in the second aspect is embodied by the signal generation circuit 102, the laser drive circuit 104, and the controller 106 in the following embodiment.

The second number of layers detecting circuit in the second aspect is embodied by the signal generation circuit 102, the laser drive circuit 104 and the controller 106 in the following embodiment.

The first demodulating circuit in the second aspect is embodied by an HDDVD decoder in the demodulation circuit 105 in the following embodiment.

The second demodulating circuit in the second aspect is embodied by a DVD decoder in the demodulation circuit 105 in the following embodiment.

The first determining circuit in the second aspect is embodied by the demodulation circuit 105 in the following embodiment.

The second determining circuit in the second aspect is embodied by the demodulation circuit 105 in the following embodiment.

The disc determining circuit in the second aspect is embodied by the controller 106 in the following embodiment.

A third aspect of the present invention relates to a disc determining method in an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the method including the steps of first number of layers detecting for detecting the number of recording layers with the laser light of the first wavelength; first determining for determining whether or not the recording layer that appears first when seen from the laser light entering side is demodulatable according to a first data format responding to the laser light of the first wavelength using the laser light of the first wavelength, when two recording layers are detected in the first number of layers detecting step; second determining for determining whether or not the recording layer that appears first when seen from the laser light entering side is demodulatable according to a second data format responding to the laser light of the second wavelength using the laser light of the first wavelength, when determined as not demodulatable in the first determining step; second number of layer detecting for detecting the number of recording layers by irradiating the laser light of the second wavelength, when determined as demodulatable in the second determining step; and disc determining for determining the loaded disc as two-wavelength two-layer disc when one recording layer is detected in the second number of layers detecting step.

The first number of layers detecting step in the third aspect corresponds to S101 to S103 in the following embodiment.

The first determining step in the third aspect corresponds to S104 and S105 in the following embodiment.

The second determining step in the third aspect corresponds to S106 in the following embodiment.

The second number of layers detecting step in the third aspect corresponds to S107 to S109 in the following embodiment.

The disc determining step in the third aspect corresponds to S109 in the following embodiment.

BRIEF DESCRIPTION OF THE DRAWINGS

The invention, together with objects and advantages thereof, may best be understood by reference to the following description of the presently preferred embodiments together with the accompanying drawings in which.

It should be noted that the drawings are merely provided for explanation purpose and should not be considered as limiting the scope of the invention in any way.

DESCRIPTION OF THE PREFERRED EMBODIMENTS

The embodiments of the present invention will now be described with reference to the drawings.

In the present embodiment, the present invention is applied to a compatible optical disc device that can respond to a DVD in which only one DVD layer is arranged (hereinafter referred to as "one layer DVD"); a DVD in which two DVD layer are arranged (hereinafter referred to as "two-layer DVD"), a next generation DVD in which only one HDDVD layer is arranged (hereinafter referred to as "one layer HDDVD"); a next generation DVD in which two HDDVD layer are arranged (hereinafter referred to as "two-layer HDDVD") in addition to the above described hybrid HDDVD in which one DVD layer and one next generation HDDVD are arranged in the thickness direction.

Figure 1:
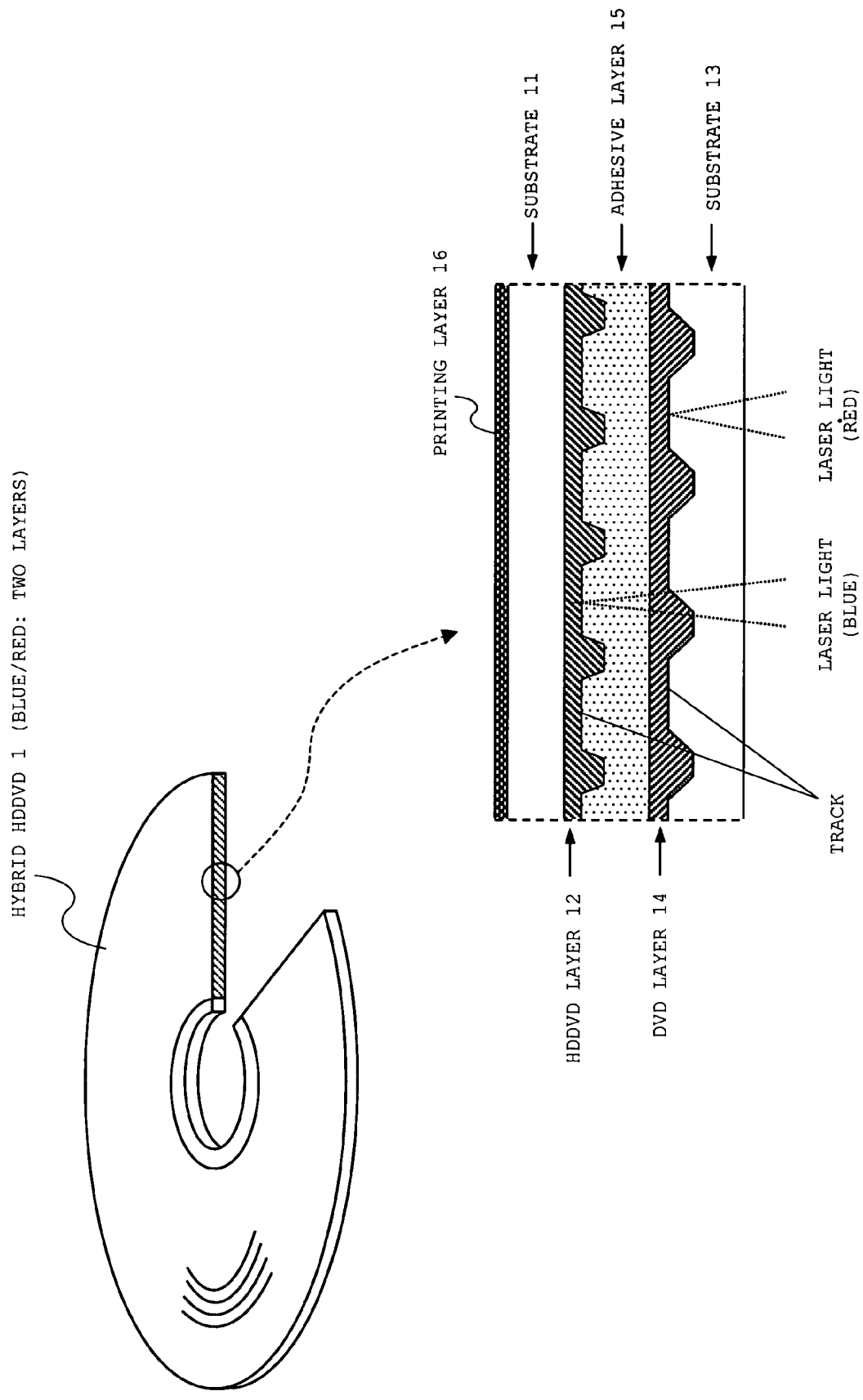
FIG. 1 is a view showing a configuration of an optical disc according to the embodiment of the present invention.

FIG. 1 shows a configuration of the hybrid HDDVD.

The hybrid HDDVD 1 has a configuration in which a substrate 11 formed with the HDDVD layer (first recording layer) 12 on one surface and a substrate 13 formed with the DVD layer (second recording layer) 14 on one surface are laminated by an adhesive layer 15, and a printing layer 16 is formed on the other surface of the substrate 11. The laser light enters from the substrate 13 side. A helical track is formed on the HDDVD layer 12 and the DVD layer 14.

The data format of the DVD layer 14 is the same as the data format of the existing DVD. Information indicating the presence of the HDDVD layer 12 is not contained in the lead-in information of the DVD layer 14. The DVD layer 14 transmits and reflects the blue laser light having a wavelength of about 405 nm and a red laser light having a wavelength of about 655 nm, respectively, at a defined ratio.

The data format complying with the next generation DVD standard is applied to the HDDVD layer 12. Information indicating the presence of the DVD layer 14 is also not contained in the lead-in information of the HDDVD layer 12. The HDDVD layer 14 is formed by a material that reflects the blue laser light at a defined reflectance, but substantially transmits all the red laser lights. Thus, the HDDVD layer 12 is not optically detected when the red laser light is used.

The two-layer DVD has a configuration in which the HDDVD layer 12 is replaced by the DVD layer in the configuration of FIG. 1. The information indicating the presence of two DVD layers is contained in the lead-in information of each DVD layer 14. The two DVD layers each transmits and reflects the red laser light having a wavelength of about 655 nm at the defined ratio. When the blue laser light having a wavelength of about 405 nm is irradiated onto the relevant disc, the two DVD layers each reflects the blue laser light at a predetermined reflectance. When the blue laser light is irradiated, detection of each DVD layer and reading of information from each DVD layer become possible by the reflected light. The configuration of the two-layer DVD and the composition of each layer etc. are already known.

The two-layer HDDVD has a configuration in which the DVD layer 14 is replaced by the HDDVD layer in the configuration of FIG. 1. In this case, the two HDDVD layers each transmits and reflects the blue laser light having a wavelength of about 405 nm at the defined ratio. When the red laser light having a wavelength of about 655 nm is irradiated onto the relevant disc, the two HDDVD layers each reflects the red laser light at a predetermined reflectance. When the red laser light is irradiated, detection of each HDDVD layer becomes possible by the reflected light. However, information cannot be appropriately read from each HDDVD layer using the red laser light since the spot size with respect to the track is large. The configuration of the two-layer HDDVD and the composition of each layer etc. are already known.

Figure 2:
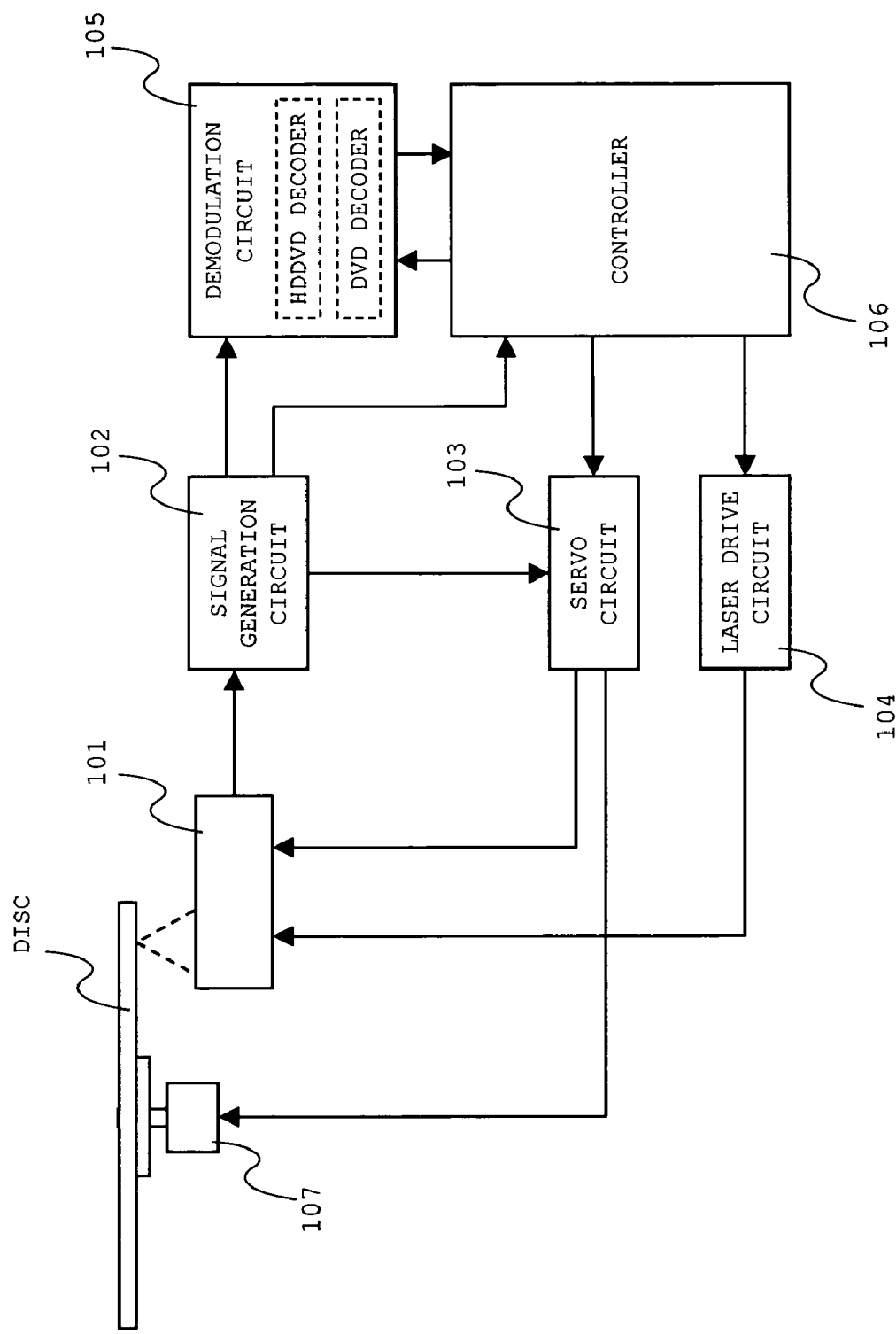
FIG. 2 is a view showing a configuration of an optical disc device according to the embodiment of the present invention.

FIG. 2 shows a configuration of the optical disc device according to the present embodiment. It should be recognized that only the blocks associated with the reproduction system are shown in the figure.

The optical disc device includes an optical pickup 101, a signal generation circuit 102, a servo circuit 103, a laser drive circuit 104, a demodulation circuit 105, a controller 106 and a spindle motor 107.

The optical pickup 101 includes a semiconductor laser for exiting the blue laser light having a wavelength of about 405 nm and a red laser light having a wavelength of about 655 nm, an objective lens for converging the laser light onto the disc, an objective lens actuator for driving the objective lens in a focusing direction and a tracking direction, a photodetector for receiving the reflected light from the disc, and an optical system for guiding the laser light from the semiconductor laser to the objective lens and for guiding the reflected light from the disc to the photodetector.

The signal generation circuit 102 performs calculation process on the signal from the photodetector arranged in the optical pickup 101, generates various signals such as RF signal, focus error signal, tracking error signal and the like and outputs the signals to the corresponding circuits.

The servo circuit 103 generates a focus servo signal and a tracking servo signal based on the signal input from the signal generation circuit 102, and outputs such signals to the objective lens actuator of the optical pickup 101. The servo circuit 103 also generates a motor servo signal based on the signal input from the signal generation circuit 102 and outputs such signal to the spindle motor 107.

The laser drive circuit 104 outputs a drive signal to the semiconductor laser in the optical pickup 101 based on the control signal input from the controller 106. The light emission of the blue laser light and the light emission of the red laser light are appropriately switched according to such control.

The demodulation circuit 105 demodulates the RF signal input from the signal generation circuit 102, generates the reproducing data and outputs the data to a subsequent circuit. The demodulation circuit 105 includes a demodulating section (DVD decoder) for performing data demodulation according to the DVD data format and a demodulation section (HDDVD decoder) for performing data demodulation according to the next generation DVD data format. Which demodulating section to use is set based on the control signal from the controller 106. In disc determination, whether or not demodulatable at each demodulating section is output from the demodulation circuit 105 to the controller 106.

The controller 106 stores various data in a built-in memory, and controls each section according to the program set in advance.

Figure 3:
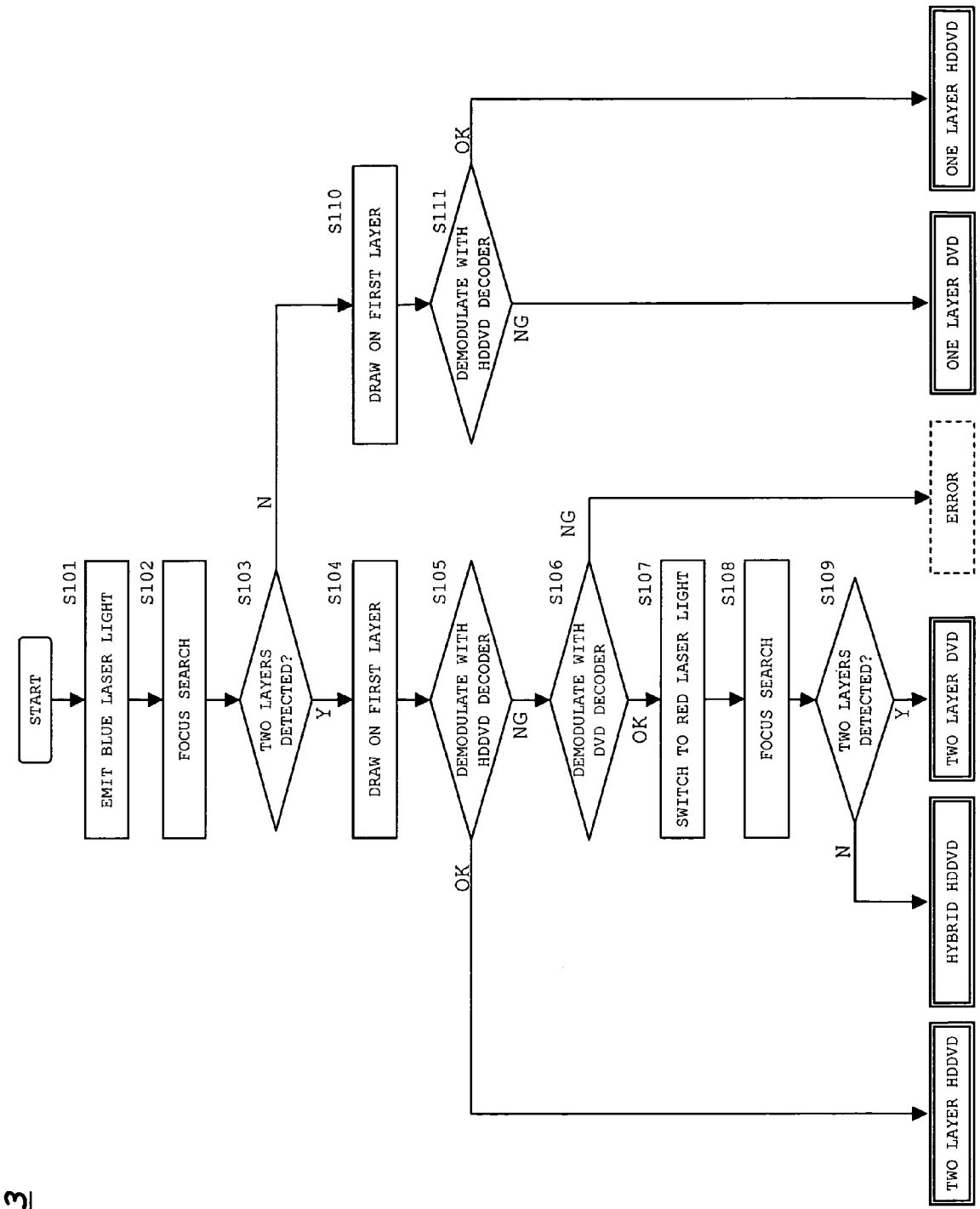
FIG. 3 is a process flowchart in disc determination according to the embodiment of the present invention.

FIG. 3 shows a process flowchart in disc determination.

When disc determining process starts after the disc is loaded, the semiconductor laser for exiting the blue laser light is first lighted (S101), and focus search on the disc is performed (S102). In focus search, the objective lens of the optical pickup 101 is moved in the focusing direction, wherein the number of S curves produced on the focus error signal is counted by the controller 106. The number of recording layers arranged in the relevant disc is detected based on the counted value (S103).

If the number of recording layers is two, the drawing operation is performed on the first recording layer on the near side when seen from the laser light entering side while emitting the blue laser light (S104). The signal read after drawing is demodulated with the HDDVD decoder in the demodulation circuit 105, and whether or not demodulatable is determined (S105).

If demodulatable with the HDDVD decoder (S105: OK), the loaded disc is determined as the two-layer HDDVD.

If not demodulatable with the HDDVD decoder (S105: NG), the signal read after drawing in S104 is demodulated with the DVD decoder in the demodulation circuit 105 and whether or not demodulatable is determined (S106).

The process of S106 may be performed parallel to the process of S105. That is, the signal read after drawing may be sequentially demodulated with the HDDVD decoder and the DVD decoder in the demodulation circuit 105, and whether or not demodulatable at each decoder is determined.

In S106, when determined as not demodulatable with the DVD decoder, the loaded disc is determined as an undeterminable disc (error). If demodulatable with the DVD decoder (S106: OK), the loaded disc is narrowed down to either the hybrid HDDVD or the two-layer DVD, and determination on which disc is made in the steps after S107.

In determination, the used laser light is first switched from the blue laser light to the red laser light (S107), and the focus search on the disc is performed with the red laser light (S108). Similar to the above, the number of S curves produced on the focus error signal is counted, and the number of recording layers arranged in the relevant disc is detected based on the counted value (S109).

If the number of recording layers is two (S109: Y), the loaded disc is determined as the two-layer DVD. If the number of recording layers is one (S109: N), the loaded disc is determined as the disc of a type in which the HDDVD layer cannot be detected with the red laser light, that is, the hybrid HDDVD.

In S103, if the number of recording layers is determined as one, the drawing operation on the relevant recording layer is performed while emitting the blue laser light (S110). The signal read after drawing is demodulated with the HDDVD decoder in the demodulation circuit 105 and whether or not demodulatable is determined (S111).

If demodulatable with the HDDVD decoder (S111: OK), the loaded disc is determined as the one layer HDDVD in which one HDDVD layer is arranged. If not demodulatable with the HDDVD decoder (S111: NG), the loaded disc is determined as the one layer DVD in which one DVD layer is arranged.

Figure 4:
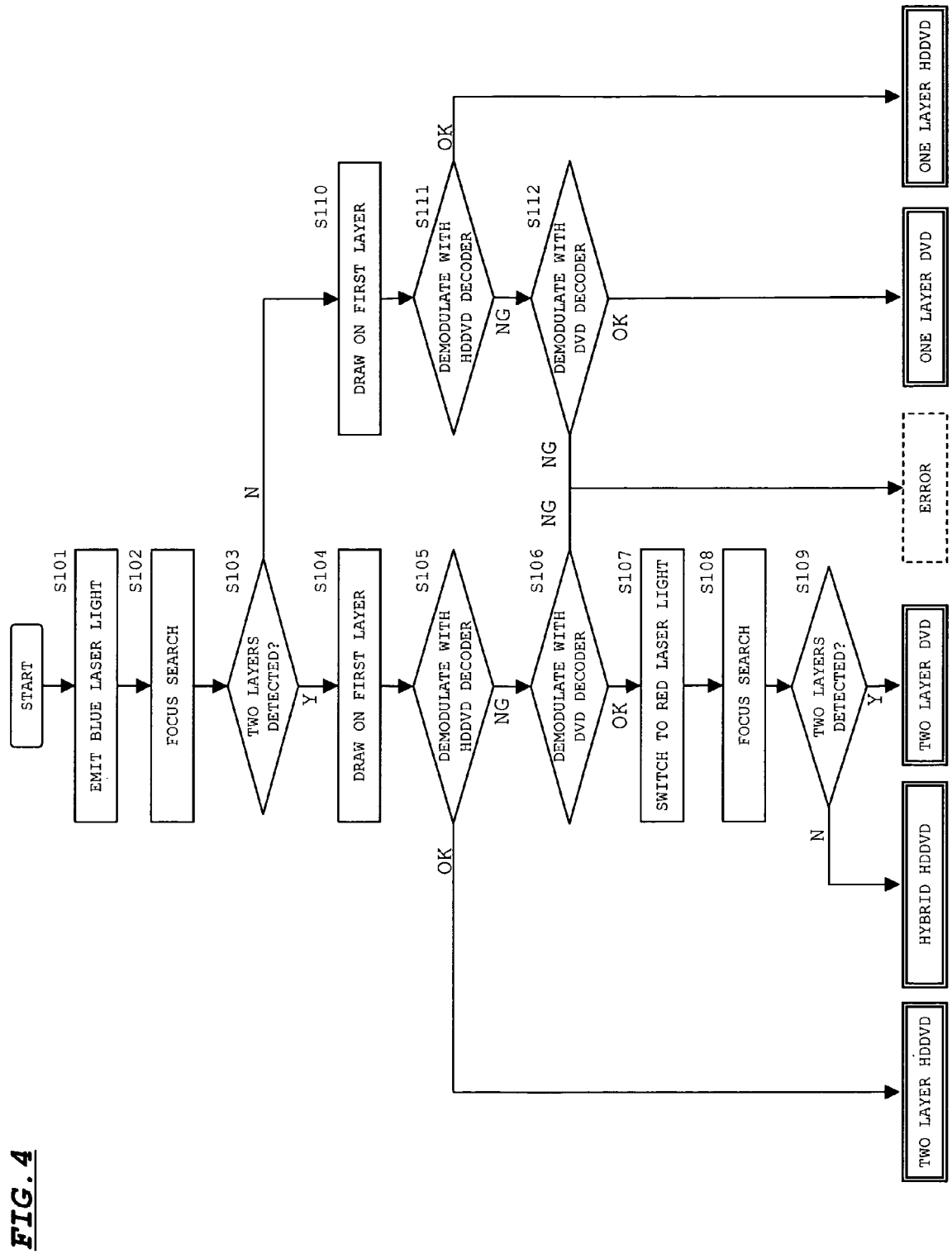
FIG. 4 is a variant of the process flowchart in disc determination according to the embodiment of the present invention.

If not demodulatable with the HDDVD decoder (S111: NG), whether or not demodulatable with the DVD decoder may be further determined (S112), as shown in FIG. 4. In this case, when demodulatable (S112:OK), the loaded disc may be determined as the one layer DVD in which one DVD layer is arranged. The determination of the one layer DVD is thereby more reliably performed.

Figure 5:
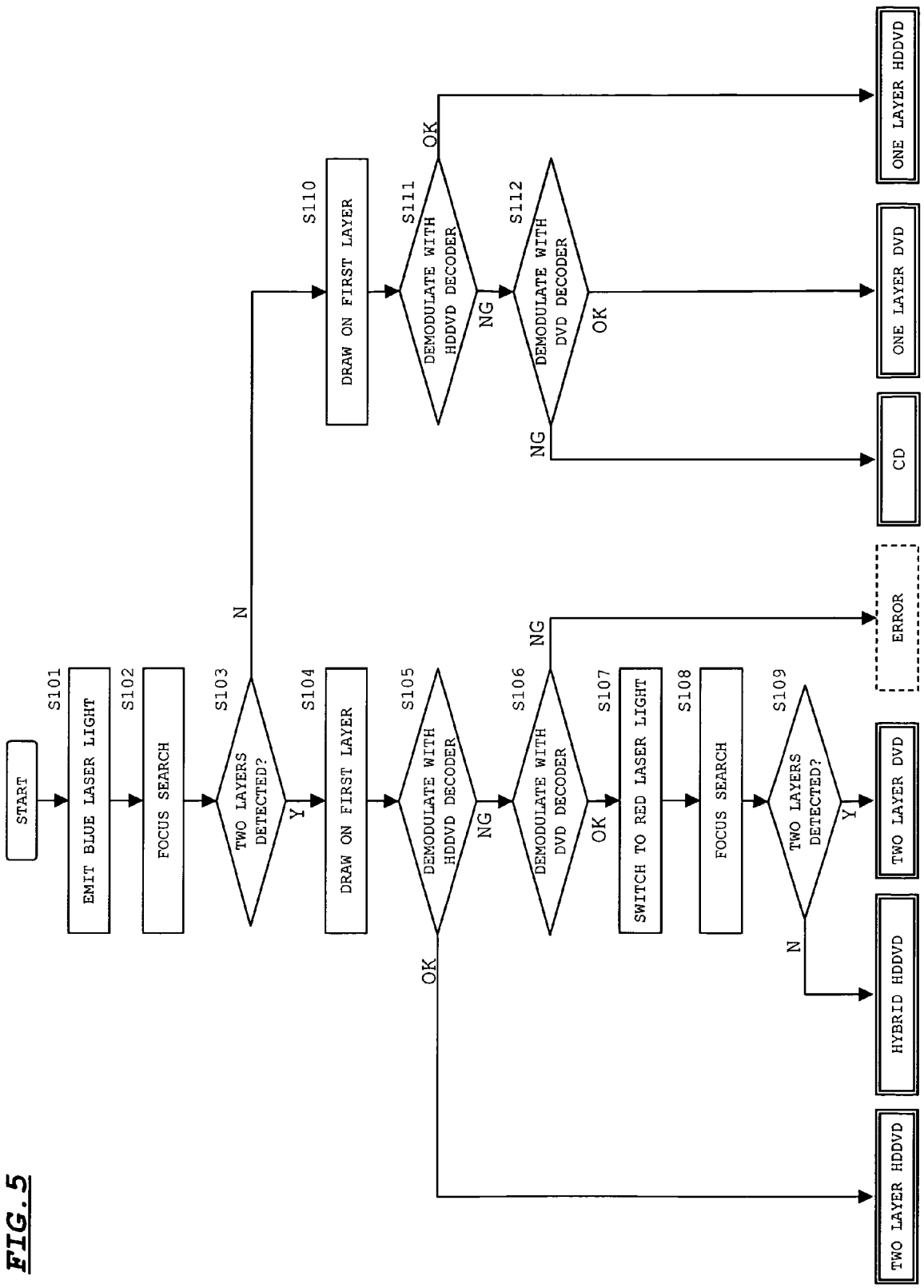
FIG. 5 is a variant of the process flowchart in disc determination according to the embodiment of the present invention.

When targeting CDs as well, if not demodulatable with the DVD decoder (S112: NG), as shown in FIG. 5, the loaded disc may be determined as a CD. In this case, a CD decoder is arranged in the demodulation circuit 105.

According to the present embodiment, the type of disc of the loaded disc is smoothly and rapidly determined.

The embodiment of the present invention is not limited to the above embodiment, and various modifications may be appropriately made without departing from the scope of the technical idea described in the appended claims.

What is claimed is:

1. An optical disc device capable of reproducing a two-wavelength two-layer disc configured by a first recording layer corresponding to a laser light of a first wavelength and a second recording layer corresponding to a laser light of a second wavelength longer than the first wavelength, the second and first recording layers being arranged from a laser light entering side in that order, and the first recording layer being not optically detected when the laser light of the second wavelength is used, the optical disc device comprising:

a first detecting means for detecting the number of recording layers arranged in an optical disc by irradiating the laser light of the first wavelength onto the optical disc loaded on the optical disc device;

a second detecting means for detecting the number of recording layers arranged in the optical disc by irradiating the laser light of the second wavelength onto the optical disc;

a first demodulating means for performing a demodulation process according to a first data format responding to the laser light of the first wavelength;

a second demodulating means for performing a demodulation process according to a second data format responding to the laser light of the second wavelength;

a first determining means for determining whether or not a signal obtained by irradiating the laser light of the first wavelength to the recording layer of the optical disc that appears first when seen from the laser light entering side is demodulatable with the first demodulating means;

a second determining means for determining whether or not the signal obtained by irradiating the laser light of the first wavelength to the recording layer of the optical disc that appears first when seen from the laser light entering side is demodulatable with the second demodulating means; and a disc determining means for determining the disc loaded on the optical disc device as the two-wavelength two-layer disc when two recording layers are detected by the first detecting means, one recording layer is detected by the second detecting means, the signal is determined as not demodulatable with the first demodulating means by the first determining means, and the signal is determined as demodulatable with the second demodulating means by the second determining means.

2. The optical disc device according to claim 1, wherein the disc determining means determines the loaded disc as a disc having two first recording layers arranged in a thickness direction of the disc when two recording layers are detected by the first detecting means, and the signal is determined as demodulatable with the first demodulating means by the first determining means.

3. The optical disc device according to claim 1 or 2, wherein
the disc determining means determines the loaded disc as a disc having two second recording layers in the thickness direction of the disc when two recording layers are detected by the first detecting means, two recording layers are detected by the second detecting means, the signal is determined as not demodulatable with the first demodulating means by the first determining means, and the signal is determined as demodulatable with the second demodulating means by the second determining means.

4. An optical disc device capable of reproducing a two-wavelength two-layer disc configured by a first recording layer corresponding to a laser light of a first wavelength and a second recording layer corresponding to a laser light of a second wavelength longer than the first wavelength, the second and first recording layers being arranged from a laser light entering side in that order, and the first recording layer being not optically detected when the laser light of the second wavelength is used, the optical disc device comprising:
an optical pickup for irradiating the laser light of the first wavelength or the laser light of the second wavelength to a disc loaded on the optical disc device;
a first detecting circuit for detecting the number of recording layers arranged in an optical disc by irradiating the laser light of the first wavelength onto the optical disc loaded on the optical disc device;
a second detecting circuit for detecting the number of recording layers arranged in the optical disc by irradiating the laser light of the second wavelength onto the optical disc;
a first demodulating circuit for performing a demodulation process according to a first data format responding to the laser light of the first wavelength;
a second demodulating circuit for performing a demodulation process according to a second data format responding to the laser light of the second wavelength;
a first determining circuit for determining whether or not a signal obtained by irradiating the laser light of the first wavelength to the recording layer of the optical disc that appears first when seen from the laser light entering side is demodulatable with the first demodulating circuit;
a second determining circuit for determining whether or not the signal obtained by irradiating the laser light of the first wavelength to the recording layer of the optical disc that appears first when seen from the laser light entering side is demodulatable with the second demodulating circuit; and
a disc determining circuit for determining the disc loaded on the optical disc device as the two-wavelength two-layer disc when two recording layers are detected by the first detecting circuit, one recording layer is detected by the second detecting circuit, the signal is determined as not demodulatable with the first demodulating circuit by the first determining circuit, and the signal is determined as demodulatable with the second demodulating circuit by the second determining circuit.

5. The optical disc device according to claim 4, wherein the disc determining circuit determines the loaded disc as a disc having two first recording layers arranged in a thickness direction of the disc when two recording layers are detected by the first detecting circuit, and the signal is determined as demodulatable with the first demodulating circuit by the first determining circuit.

6. The optical disc device according to claim 4 or 5, wherein
the disc determining circuit determines the loaded disc as a disc having two second recording layers arranged in the thickness direction of the disc when two recording layers are detected by the first detecting circuit, two recording layers are detected by the second detecting circuit, the signal is determined as not demodulatable with the first demodulating circuit by the first determining circuit, and the signal is determined as demodulatable with the second demodulating circuit by the second determining circuit.

7. A disc determining method in an optical disc device capable of reproducing a two-wavelength two-layer disc configured by a first recording layer corresponding to a laser light of a first wavelength and a second recording layer corresponding to a laser light of a second wavelength longer than the first wavelength, the second and first recording layers being arranged from a laser light entering side in that order, and the first recording layer being not optically detected when the laser light of the second wavelength is used, the method comprising the steps of:
detecting the number of recording layers with the laser light of the first wavelength;
determining whether or not a signal obtained by irradiating the laser light of the first wavelength to the recording layer that appears first when seen from the laser light entering side is demodulatable according to a first data format responding to the laser light of the first wavelength, when two recording layers are detected in the first detecting step;
determining whether or not the signal obtained by irradiating the laser light of the first wavelength to the recording layer that appears first when seen from the laser light entering side is demodulatable according to a second data format responding to the laser light of the second wavelength, when the signal is determined as not demodulatable in the first determining step;
detecting the number of recording layers by irradiating the laser light of the second wavelength, when the signal is determined as demodulatable in the second determining step; and
determining the loaded disc as two-wavelength two-layer disc when one recording layer is detected in the second detecting step.

8. The disc determining method according to claim 7, wherein
the loaded disc determining step determines the loaded disc as a disc having two first recording layers arranged in a thickness direction of the disc when the signal is determined as demodulatable in the first determining step.

9. The disc determining method according to claim 7 or 8, wherein
the loaded disc determining step determines the loaded disc as a disc having two second recording layers in the thickness direction of the disc when two recording layers are detected in the step of detecting with the laser light of the second wavelength.

* * * * *